…

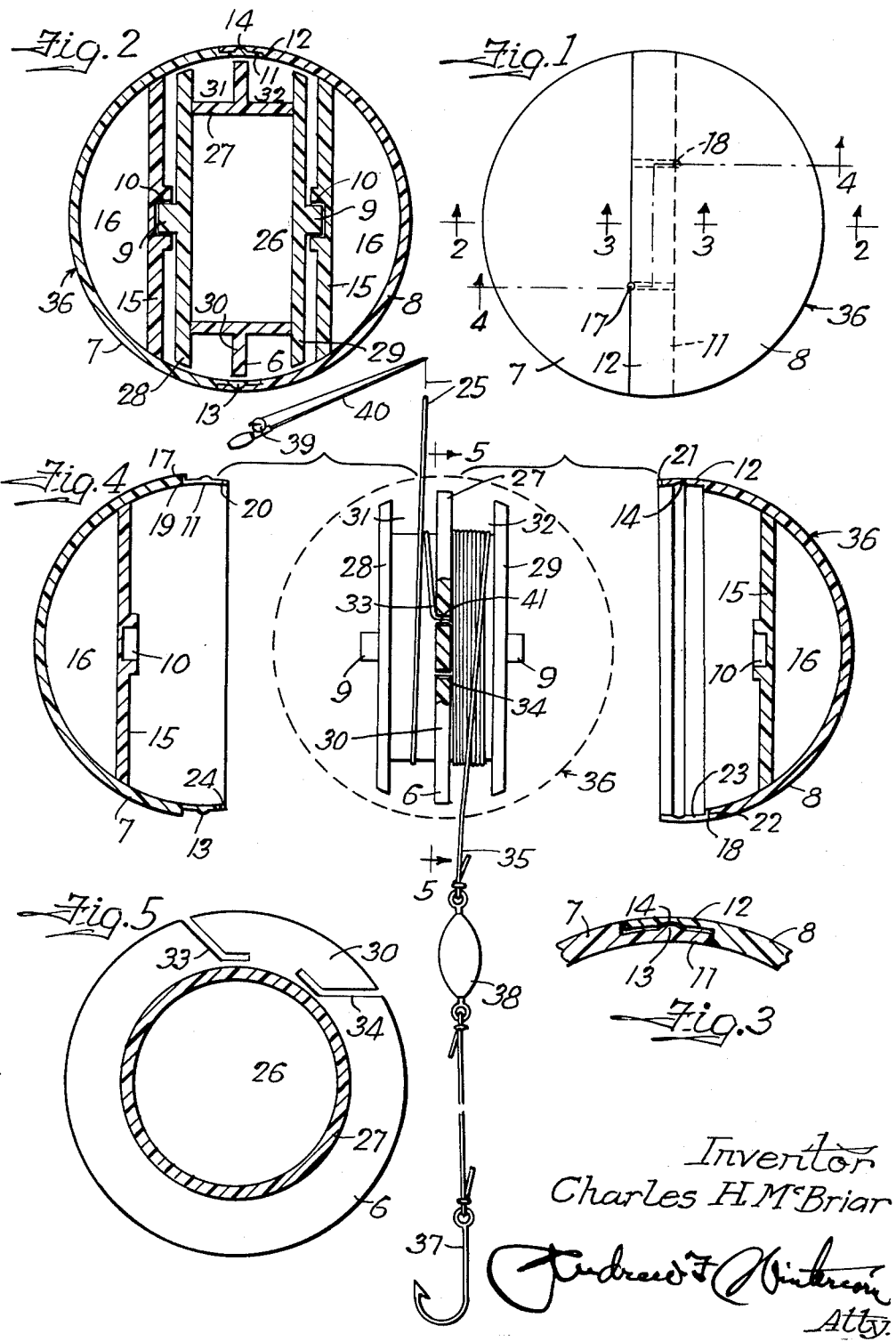

United States Patent Office 3,141,256
Patented July 21, 1964

3,141,256
FISHING BOBBER
Charles H. McBriar, 1115 Johnson St., Beloit, Wis.
Filed July 5, 1961, Ser. No. 121,942
6 Claims. (Cl. 43—43.11)

This invention relates to bobbers for still fishing, and is more particularly concerned with one equipped with a built-in reel on which the line from the pole winds in one direction on one side and the line to the hook or hooks and sinker winds in the same direction on the other side to a predetermined length, whereby to predetermine the depth of the hook or hooks relative to the bobber, the sinker causing the hooks and bait to be lowered by gravity automatically after the bobber is cast.

I am aware that others have proposed bobbers designed to give bait depth control in a similar way, but all of these that I have seen were impractical and much too complicated and expensive, and were unsatisfactory also from the standpoint that the addition of the reel means added too much weight and deprived the bobber of buoyancy to such an extent that the bobber would not ride high enough in the water to be at all satisfactory. It is, therefore, the principal object of my invention to provide a bobber with built-in reel for depth control purposes so designed and constructed as to avoid all of the objections noted in prior constructions, a salient feature of the bobber of my invention being its three-element hollow plastic construction, which means actually the reduction to a minimum number of elements, and another important feature being the provision in each of the interlockable shell halves of a sizeable sealed air chamber, and the provision of another and much larger sealed air chamber in the reel element, whereby to insure good buoyancy.

The invention is illustrated in the accompanying drawing, wherein—

FIG. 1 is an elevational view of a still fishing all plastic, three-element bobber made in accordance with my invention;

FIG. 2 is a cross-section on line 2—2 of FIG. 1;

FIG. 3 is an enlarged sectional detail on line 3—3 of FIG. 1;

FIG. 4 is a general view, including with a diagrammatic showing of a fish pole, an exploded view of the bobber, partly in elevation and partly in section, the reel in the bobber being shown mostly in elevation, and the shell halves being shown in section on the broken line 4—4 of FIG. 1, and FIG. 5 is a sectional detail of the reel taken on line 5—5 of FIG. 4.

The same reference numerals are applied to corresponding parts throughout the views.

Referring to the drawing, the reel 6 that is enclosed between the two halves 7 and 8 of the spherical bobber shell has trunnions 9 on the axis of rotation thereof received freely in bearings 10 when the two halves of the shell are assembled together. The one half 7 has a reduced rim portion 11, fitting inside the reduced rim portion 12 on the other half 8. The shell may be locked in assembled condition in various ways, but, for simplicity and economy, I prefer to have the shell halves 7 and 8 interlocked releasably by the engagement with a snap-action of an annular rounded bead 13 on the outer periphery of flexible rim 11 in an annular internal groove 14 in the inner periphery of flexible rim 12, both rims when flexed enough to permit the connection returning to normal by virtue of the inherent resilience of the plastic material. The shell halves are molded of light weight plastic material and, for greater buoyancy, disks 15 of equal diameter and molded of plastic material are cemented in the two shell halves in parallel relationship to one another and to the rims 11 and 12 to provide sealed air chambers 16. The bearings 10 are molded integral with the disks 15 at the center thereof.

A small radial hole 17 is provided in the shell in half 7, and another radial hole 18 is provided in the shell in half 8 in diametrically opposed relation to hole 17. Hole 17 is defined half by a radial groove 19 in shell part 7, at the inner end of a radial slot 20 extending the full width of reduced rim portion 11, and the other half of hole 17 is defined by a registering radial groove 21 provided in shell part 8 at the outer end of reduced rim portion 12. In like manner, hole 18 is defined half by a radial groove 22 at the inner end of a radial slot 23 extending the full width of reduced rim portion 12 and the other half of hole 18 is defined by a registering radial groove 24 provided in shell part 7 at the outer end of reduced rim portion 11. The slots 20 and 23 enable entering the line 25 in the holes 17 and 18.

The reel 6 is also of hollow, generally cylindrical, molded plastic construction and provides a sealed air chamber 26 therein for greater buoyancy of the bobber. It is molded in three parts 27, 28, and 29, which are suitably cemented together. Side plates 28 and 29 are circular and are alike and interchangeable and have the cylindrical trunnions 9 molded integral with the central portions thereof in coaxial relation to one another. Hub part 27 is in the form of a ring of smaller diameter than side plates 28–29 with an annular external flange 30 molded integral with the middle portion thereof to define on opposite sides thereof two annular reel portions 31 and 32 whereon line 25 is adapted to be wound in one direction on one portion, as shown on portion 31 in FIG. 4, and in the same direction on the other portion as on 32 in FIG. 4, so that as the line is reeled in on one portion of the reel it is reeled out simultaneously from the other portion, and vice versa. The middle flange 30 has two circumferentially spaced bayonet slots 33 and 34 provided therein in inwardly converging relation opening to the periphery of the flange, and a length of the line between the lengths wound on portions 31 and 32 is wound several rounds between these slots to prevent slippage of the line relative to the reel and permit predetermining the depth to which the hook and sinker carrying end portion 35 of the line 25 can extend down from the bobber 36 and accordingly predetermine the depth of the hook or hooks 37 and sinker 38.

A line 25 is indicated in FIG. 4 extending from a reel 39 on a fishing pole 40 and arranged to pass through the hole 17 in the shell 36 above the left side or half 31 of reel 6, on which it is wound in one direction, the line extending downwardly from the right half or side 32 of the reel, on which it is wound in the same direction, and arranged to pass through hole 18, an intermediate length of the line between the portions wound on 31 and 32 being wound several rounds in the slots 33 and 34 as shown at 41 in FIG. 4 to prevent slippage in controlling the depth of the bait.

In operation, assuming the fisherman wants to have the hook or hooks 37 suspended, say 15 feet or so below the surface, but no more, he winds 15 feet of line on the reel 6 at 32 and with the sinker weight 38 just outside hole 18, he casts the bobber and sinker weight out in the usual way to the spot desired. When the bobber lands on the water the line wound on reel portion 32 unwinds and an equal length of line 25 from the pole winds on the other half 31 of the reel 6 so that the sinker weight 38 cannot drop down any farther than the predetermined 15 feet, mentioned before. When a fish is caught, as indicated by movement of the bobber, the sudden jerk on the line is enough to catch the fish, and as the fisherman reels in on the line, he unwinds that portion on the half 31 of the reel 6 first, and in so doing, winds up on the other half 32 of the reel 6 that portion 35 of the line extending down to the sinker weight 38, and as a result, when the fish is reeled in, the sinker weight 38 will be next to the hole 18 on the bobber and act as a limit stop. Thereafter, the fisherman, after rebaiting the hook or hooks 37, is therefore all set to make the next cast unless he decides to change the depth to which the sinker 38 can descend, in which event the tie-up of the line 25 with reel 6 at 41 in slots 33–34 is unwound to permit shifting the line 25 one way or the other namely, more to the right 32 or more to the left 31, before a new tie-up is made at 41, so that a different amount of line can be wound on portion 32 of reel 6. When a change of depth of bait is desired, it is a simple matter to reset the bobber reel 6 relative to the hook and sinker end portion 35 of the line. It is obvious that at least as much line should be wound on portion 31 of the reel as is wound on portion 32. Otherwise there would not be enough line to unwind from portion 31 in the winding up of line on portion 32 to bring the sinker 38 up to the bobber as described when a fish is caught. The present bobber is of simple and very light weight but durable construction, and can be produced at lower cost than most others designed to give similar results. The sealed in air chambers and the reduction in weight all around insure the bobber riding high enough in the water to be easily visible at all times.

It is believed the foregoing description conveys a good understanding of the objects and advantages of my invention. The appended claims have been drawn to cover all legitimate modifications and adaptations.

I claim:

1. A fishing bobber comprising a hollow shell made up of two separable halves, both of buoyant hollow construction, two coaxially aligned bearings on a diametrical line through said shell halves, one in the center of each half, the halves each having a generally cylindrical internal recess of equal depth provided therein on opposite sides of the diametrical plane of division in concentric relationship to but of appreciably larger radius than said bearings to accommodate a reel therebetween, means for detachably securing the halves together to form a unitary shell, and a reel of generally cylindrical form and buoyant hollow construction disposed inside said shell in said recesses in the aforesaid diametrical plane through said shell, said reel having projecting from its opposite sides coaxially aligned trunnions received in said bearings, each shell half having a small opening provided therein for extension therethrough of a fishing line, the opening in one shell half being aligned with one side portion of the reel closest thereto, and the opening in the other shell half being aligned with the other side portion of the reel closest thereto, and said reel having means thereon between the two side portions whereby the fishing line may be secured to the reel between rounds of the line wound in one direction on one side portion and other rounds of the line wound in the same direction on the other side portion of the reel, each of said bearings being provided on a wall normal to the diametrical line through said shell defining on one side the inner end of the aforesaid recess while closing a sealed air chamber on its other side in the shell half, said walls in the assembled relationship of the shell halves being disposed in equally spaced parallel relationship to the diametrical plane of division through said shell.

2. A bobber as set forth in claim 1 wherein the reel includes a sealed air chamber therein located at the center of the shell defined by the shell halves.

3. A bobber as set forth in claim 1 wherein the reel includes a sealed air chamber therein located at the center of the shell defined by the shell halves, the air chamber in the reel being larger than either of the air chambers in the shell halves.

4. A bobber as set forth in claim 1 including on the reel an annular flange disposed in the diametrical plane of division through said shell, said flange separating the side portions of the reel through the middle of the reel so as to separate the rounds of line wound in one direction on one side of the reel from the rounds of line wound in the same direction on the other side of the reel.

5. A bobber as set forth in claim 1 wherein the wall on which each of said bearings is provided comprises a circular disk, said disks being secured at their peripheries in the shell halves and having the bearings for said reel provided integral therewith at the center on the outer side.

6. A fishing bobber comprising a hollow shell made up of two separable halves, both of buoyant hollow construction, two coaxially aligned bearings on a diametrical line through said shell halves, one in the center of each half, the halves each having a generally cylindrical internal recess of equal depth provided therein on opposite sides of the diametrical plane of division in concentric relationship to but of appreciably larger radius than said bearings to accommodate a reel therebetween, means for detachably securing the halves together to form a unitary shell, and a reel of generally cylindrical form and buoyant hollow construction disposed inside said shell in said recesses in the aforesaid diametrical plane through said shell, said reel having projecting from its opposite sides coaxially aligned trunnions received in said bearings, each shell half having a small opening provided therein for extension therethrough of a fishing line, the opening in one shell half being aligned with one side portion of the reel closest thereto, and the opening in the other shell half being aligned with the other side portion of the reel closest thereto, said said reel having means thereon between the two side portions whereby the fishing line may be secured to the reel between rounds of the line wound in one direction on one side portion and other rounds of the line wound in the same direction on the other side portion of the reel, there being small sealed air chambers of equal size provided in diametrically opposite sides of said shell for balanced buoyancy of said shell, the hollow reel providing a sealed air chamber therein, larger than the air chamber in either of the shell halves, located at the center of the shell defined by the shell halves.

References Cited in the file of this patent

UNITED STATES PATENTS

| | | |
|---|---|---|
| 541,789 | Kunzelman | June 25, 1895 |
| 1,973,028 | Thomas | Sept. 11, 1934 |
| 2,479,642 | Schiffmann | Aug. 23, 1949 |
| 2,669,054 | Smith | Feb. 16, 1954 |
| 2,728,161 | Mangel et al. | Dec. 27, 1955 |
| 2,955,379 | Hull | Oct. 11, 1960 |
| 2,984,040 | Fogaley | May 16, 1961 |